US 12,355,540 B2

(12) United States Patent
Yuan et al.

(10) Patent No.: US 12,355,540 B2
(45) Date of Patent: Jul. 8, 2025

(54) BEAM FAILURE DETECTION EVALUATION ON TWO TRANSMISSION CONFIGURATION INDICATOR STATES

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/264,533

(22) PCT Filed: Apr. 30, 2021

(86) PCT No.: PCT/CN2021/091350
§ 371 (c)(1),
(2) Date: Aug. 7, 2023

(87) PCT Pub. No.: WO2022/226969
PCT Pub. Date: Nov. 3, 2022

(65) Prior Publication Data
US 2024/0048215 A1    Feb. 8, 2024

(51) Int. Cl.
*H04L 23/02*    (2006.01)
*H04B 7/06*    (2006.01)
(Continued)

(52) U.S. Cl.
CPC ......... *H04B 7/06964* (2023.05); *H04B 7/088* (2013.01); *H04L 5/0025* (2013.01)

(58) Field of Classification Search
CPC .... H04B 7/0695; H04B 5/0035; H04B 7/088; H04B 7/06969; H04L 7/06952; H04L 17/336; H04L 5/14; H04W 7/619; H04W 24/10; H04W 80/02
USPC ................................ 375/262, 260, 267, 299
See application file for complete search history.

(56) References Cited

U.S. PATENT DOCUMENTS

2020/0100311 A1\*  3/2020  Cirik ..................... H04W 72/23
2020/0350972 A1\*  11/2020  Yi ............................. H04L 1/12
(Continued)

FOREIGN PATENT DOCUMENTS

CN    110418357 A    11/2019
CN    110557977 A    12/2019
(Continued)

OTHER PUBLICATIONS

International Search Report and Written Opinion—PCT/CN2021/091350—ISA/EPO—Jan. 26, 2022.
(Continued)

*Primary Examiner* — Khai Tran
(74) *Attorney, Agent, or Firm* — Harrity & Harrity, LLP

(57) ABSTRACT

Various aspects of the present disclosure generally relate to wireless communication. In some aspects, a user equipment (UE) may monitor for a first beam failure detection (BFD) reference signal (RS) and a second BFD RS, wherein the first BFD RS is associated with a first transmission configuration indicator (TCI) state and the second BFD RS is associated with a second TCI state, and wherein the first BFD RS and the second BFD RS are associated with one or more physical downlink control channels (PDCCHs). The UE may determine whether a beam failure has occurred with the one or more PDCCHs based at least in part on a result of monitoring for the first BFD RS and the second BFD RS. Numerous other aspects are described.

28 Claims, 7 Drawing Sheets

500

510 — Monitor for a first BFD RS and a second BFD RS, wherein the first BFD RS is associated with a first TCI state and the second BFD RS is associated with a second TCI state, wherein the first BFD RS and the second BFD RS are associated with one or more PDCCHs 520 — Determine whether a beam failure has occurred with the one or more PDCCHs based at least in part on a result of monitoring for the first BFD RS and the second BFD RS

(51) Int. Cl.
*H04B 7/08* (2006.01)
*H04L 5/00* (2006.01)

(56) References Cited

U.S. PATENT DOCUMENTS

| | | | | |
|---|---|---|---|---|
| 2022/0173785 A1* | 6/2022 | Venugopal | ............ | H04W 72/23 |
| 2022/0201519 A1* | 6/2022 | Huang | .................... | H04L 5/005 |
| 2022/0294514 A1* | 9/2022 | Kang | ....................... | H04L 5/005 |
| 2023/0106244 A1* | 4/2023 | Yu | ......................... | H04L 5/0035 |
| | | | | 370/329 |
| 2024/0098531 A1* | 3/2024 | Gao | ..................... | H04B 7/0695 |
| 2024/0137096 A1* | 4/2024 | Zheng | ............... | H04B 7/06952 |
| 2024/0306015 A1* | 9/2024 | Matsumura | ........... | H04L 5/0023 |

FOREIGN PATENT DOCUMENTS

| | | |
|---|---|---|
| WO | WO-2019215389 A2 | 11/2019 |
| WO | 2021029755 A1 | 2/2021 |

OTHER PUBLICATIONS

Xiaomi: "Enhancements on HST-SFN Operation for Multi-TRP PDCCH Transmission", 3GPP TSG RAN WG1 #104b-e, R1-2102963, e-Meeting, Apr. 12-20, 2021, section 2.2, 4 Pages.

Xiaomi: "Enhancements on Multi-TRP for PDCCH, PUCCH and PUSCH", 3GPP TSG-RAN WG1 Meeting #104b-e, R1-2102960, 3rd Generation Partnership Project (3GPP), Mobile Competence Centre, 650, Route Des Lucioles, F-06921 Sophia-Antipolis Cedex, France , vol. RAN WG1, No. e-Meeting, 20210412-20210420, 19 Pages, Apr. 7, 2021, XP052177794, p. 9-p. 13.

3GPP TS 38.133: "3GPP Technical Specification Group Radio Access Network, NR, Requirements for Support of Radio Resource Management (Release 17)", 3GPP Standard, Technical Specification, 3GPP TS 38.133, 3GPP, Mobile Competence Centre, 650, Route Des Lucioles, F-06921 Sophia-Antipolis Cedex, France, vol. RAN WG4, No. V17.0.0 Jan. 12, 2021, 381 Pages, XP051999669, p. 144, chapters 8.5.2.1, 8.5.2.2, 8.5.3.1, 8.5.3.2.

Supplementary European Search Report—EP21938445—Search Authority—Munich—Dec. 11, 2024.

* cited by examiner

BEAM FAILURE DETECTION EVALUATION ON TWO TRANSMISSION CONFIGURATION INDICATOR STATES

CROSS-REFERENCE TO RELATED APPLICATION

This Patent Application is a 371 National Phase of PCT/CN2021/091350, filed Apr. 30, 2021, entitled "BEAM FAILURE DETECTION EVALUATION ON TWO TRANSMISSION CONFIGURATION INDICATOR STATES," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for beam failure detection evaluation on two transmission configuration indicator states.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory, and one or more processors, coupled to the memory, configured to: monitor for a first beam failure detection (BFD) reference signal (RS) and a second BFD RS, wherein the first BFD RS is associated with a first transmission configuration indicator (TCI) state and the second BFD RS is associated with a second TCI state, wherein the first BFD RS and the second BFD RS are associated with one or more physical downlink control channels (PDCCHs); and determine whether a beam failure has occurred with the one or more PDCCHs based at least in part on a result of monitoring for the first BFD RS and the second BFD RS.

In some aspects, a method of wireless communication performed by a UE includes monitoring for a first BFD RS and a second BFD RS, wherein the first BFD RS is associated with a first TCI state and the second BFD RS is associated with a second TCI state, wherein the first BFD RS and the second BFD RS are associated with one or more PDCCHs; and determining whether a beam failure has occurred with the one or more PDCCHs based at least in part on a result of monitoring for the first BFD RS and the second BFD RS.

In some aspects, a non-transitory computer-readable medium storing a set of instructions for wireless communication includes one or more instructions that, when executed by one or more processors of a UE, cause the UE to: monitor for a first BFD RS and a second BFD RS, wherein the first BFD RS is associated with a first TCI state and the second BFD RS is associated with a second TCI state, wherein the first BFD RS and the second BFD RS are associated with one or more PDCCHs; and determine whether a beam failure has occurred with the one or more PDCCHs based at least in part on a result of monitoring for the first BFD RS and the second BFD RS.

In some aspects, an apparatus for wireless communication includes means for monitoring for a first BFD RS and a second BFD RS, wherein the first BFD RS is associated with a first TCI state and the second BFD RS is associated with a second TCI state, wherein the first BFD RS and the second BFD RS are associated with one or more PDCCHs; and means for determining whether a beam failure has occurred with the one or more PDCCHs based at least in part on a result of monitoring for the first BFD RS and the second BFD RS.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
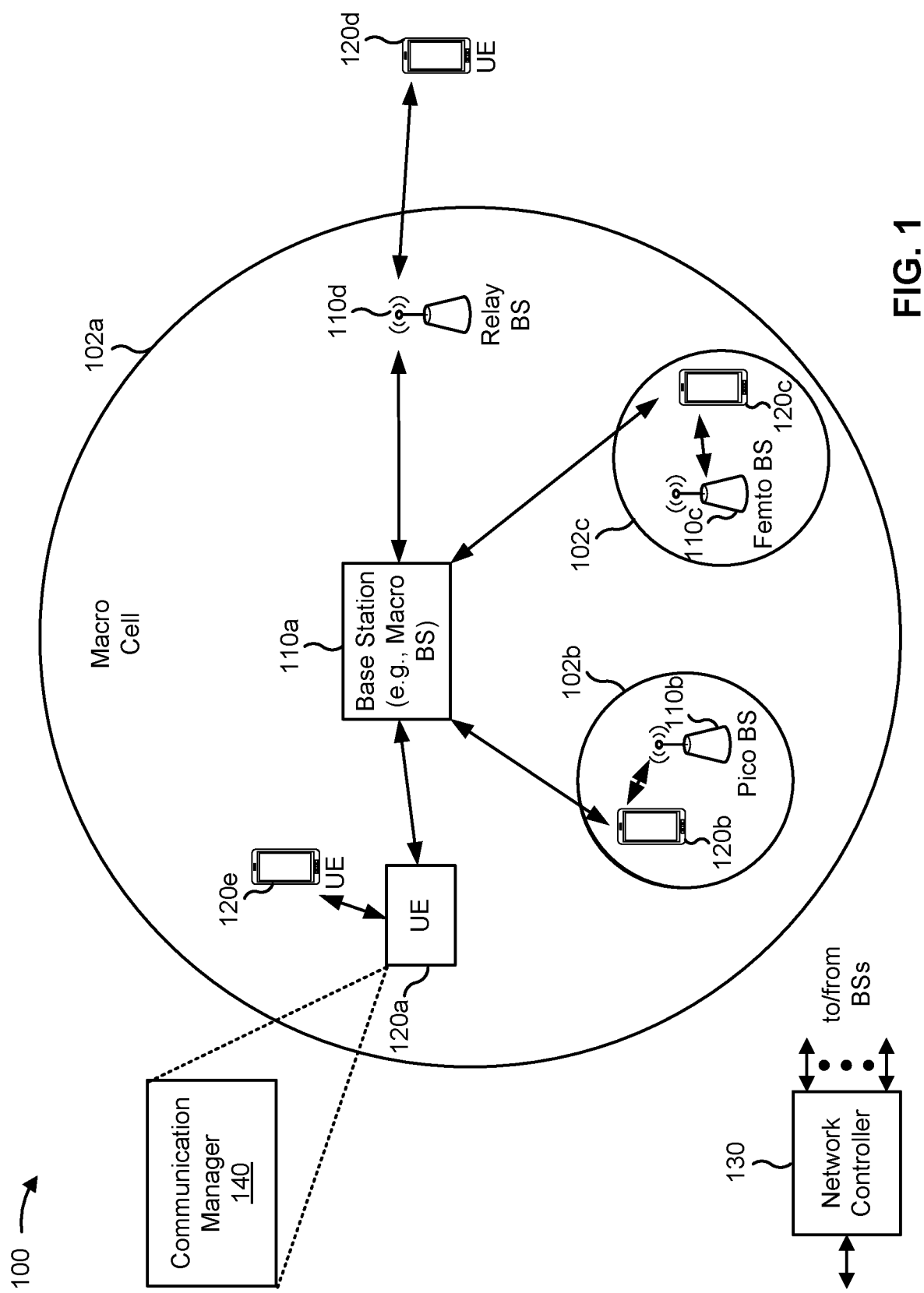
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may monitor for a first beam failure detection (BFD) reference signal (RS) and a second BFD RS, wherein the first BFD RS is associated with a first transmission configuration indicator (TCI) state and the second BFD RS is associated with a second TCI state, wherein the first BFD RS and the second BFD RS are associated with one or more physical downlink control channels (PDCCHs); and determine whether a beam failure has occurred with the one or more PDCCHs based at least in part on a result of monitoring for the first BFD RS and the second BFD RS. Additionally, or alternatively, the communication manager 140 may perform one or more other operations described herein.

As indicated above, FIG. 1 is provided as an example. Other examples may differ from what is described with regard to FIG. 1.

Figure 2:
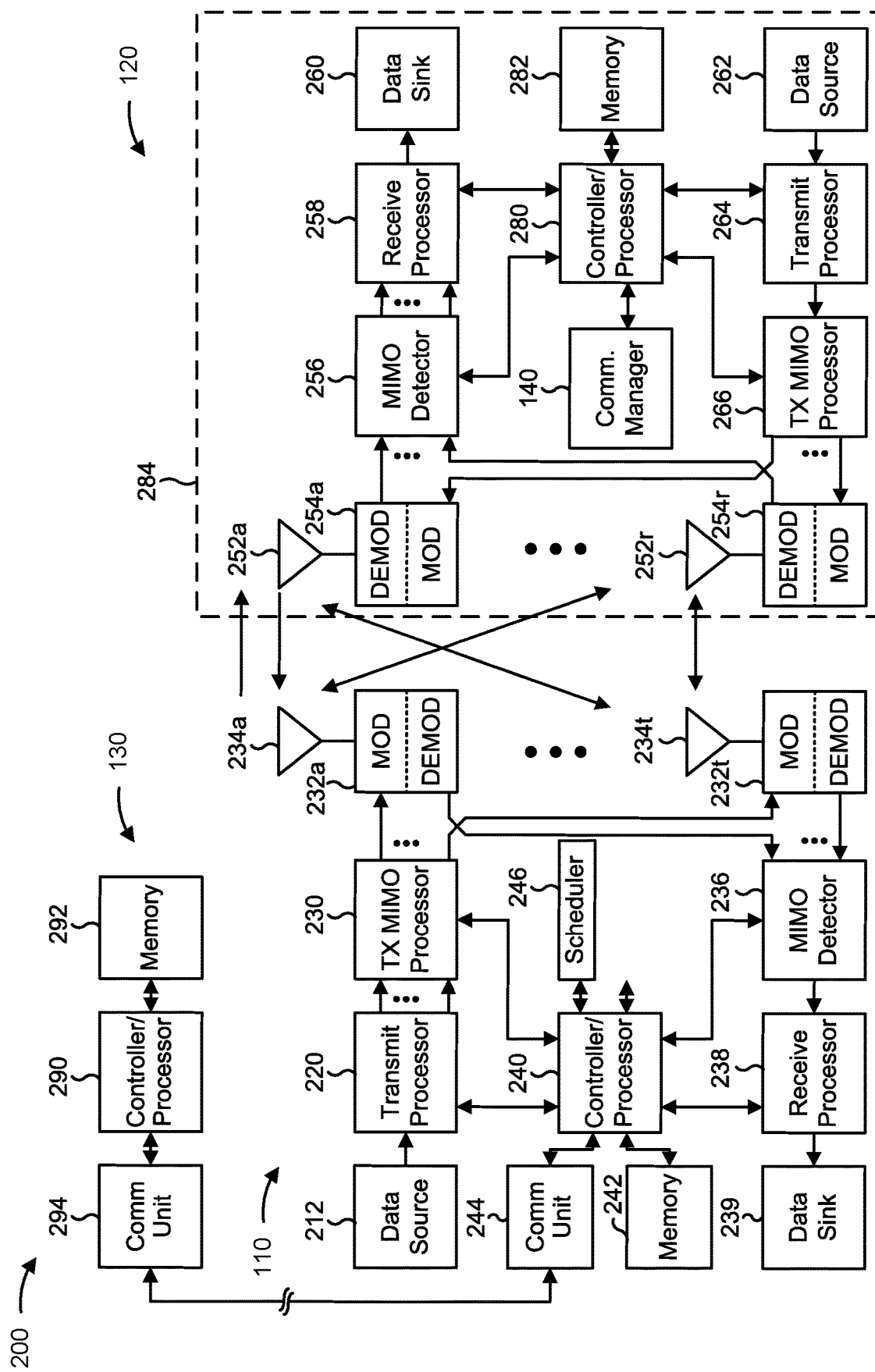
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-5).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-5).

Controller/processor 240 of base station 110, controller/processor 280 of UE 120, and/or any other component(s) of FIG. 2 may perform one or more techniques associated with beam failure detection (BFD) evaluation on two transmission configuration indicator (TCI) states, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5 and/or other processes as described herein. In some aspects, executing instructions may include running the instructions, converting the instructions, compiling the instructions, and/or interpreting the instructions, among other examples.

In some aspects, a UE includes means for monitoring for a first BFD reference signal (RS) and a second BFD RS, wherein the first BFD RS is associated with a first TCI state and the second BFD RS is associated with a second TCI state, wherein the first BFD RS and the second BFD RS are associated with one or more physical downlink control channels (PDCCHs); and/or means for determining whether a beam failure has occurred with the one or more PDCCHs based at least in part on a result of monitoring for the first BFD RS and the second BFD RS. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
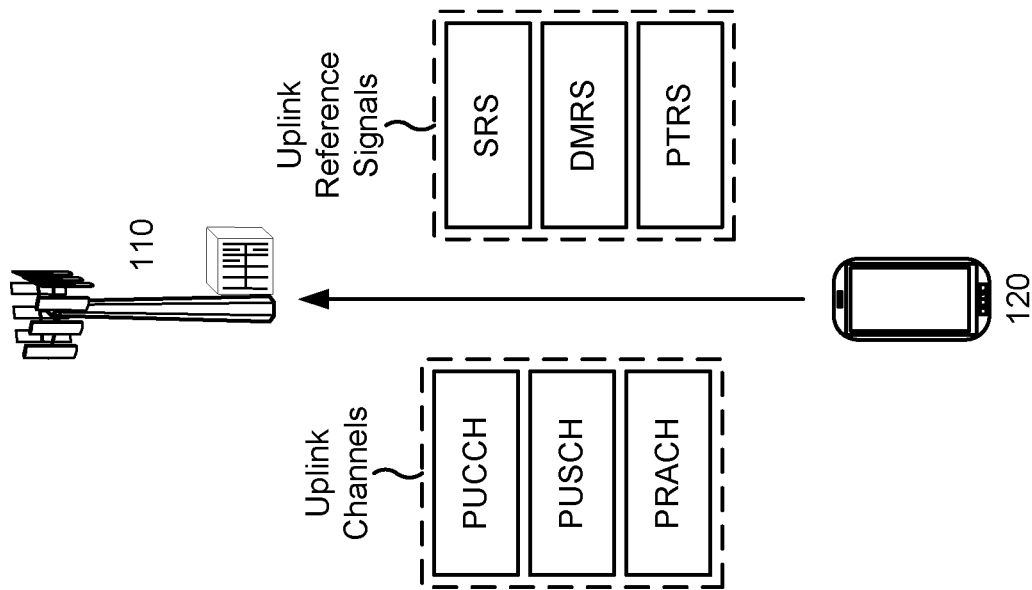
FIG. 3 is a diagram illustrating an example of physical channels and reference signals in a wireless network, in accordance with the present disclosure.
Figure 3:
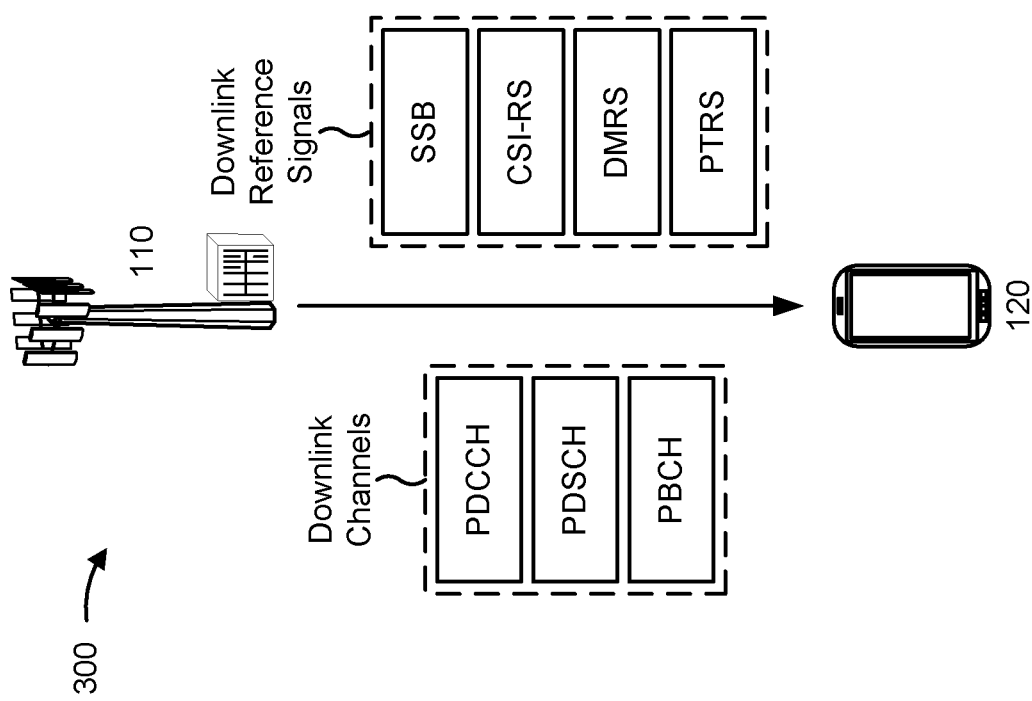

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a PDCCH that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

In some communications systems, a UE may monitor for one or more PDCCH transmissions that are associated with a plurality of TCI states. For example, a PDCCH transmission may be associated with one control resource set (CORESET) and two active TCI states. Additionally, or alternatively, the PDCCH may be associated with one synchronization signal (SS) set, which is associated with two different CORESETS and each CORESET is associated with one active TCI state. Additionally, or alternatively, the PDCCH may be associated with two different SS sets, which are associated with respective different CORESETS, each of which is associated with an active TCI state.

For a single PDCCH associated with a single TCI state, a UE may be configured with a single set of PDCCH transmission parameters and use a single BFD RS for evaluating whether a beam failure has occurred for the single PDCCH. In this case, the UE may not differentiate between PDCCH block error rate (BLER) requirements that may differ for differing use cases, such as ultra-reliable low latency communication (URLLC) or enhanced mobile broadband (eMBB) communication. However, the UE may not be configured for BFD in the case where the UE is capable of monitoring a plurality of PDCCHs and a plurality of TCI states. As a result, the UE may only monitor a first PDCCH and a first TCI state to detect a beam failure, and may miss a beam failure that is detectable on a second PDCCH and a second TCI state, thereby resulting in poor communication performance or dropped communications, among other examples.

Some aspects described herein enable BFD using one or more PDCCHs associated with a plurality of TCI states. For example, the UE may monitor a plurality of TCI states on a single PDCCH or respective TCI states on respective PDCCHs to detect a beam failure on the single PDCCH, on each of the respective PDCCHs, or on one of the respective PDCCHs. In this way, the UE may improve a likelihood of detecting a beam failure, relative to only monitoring a single PDCCH and a single TCI state to detect beam failure, thereby improving communication performance or reducing dropped communications, among other examples.

Figure 4:
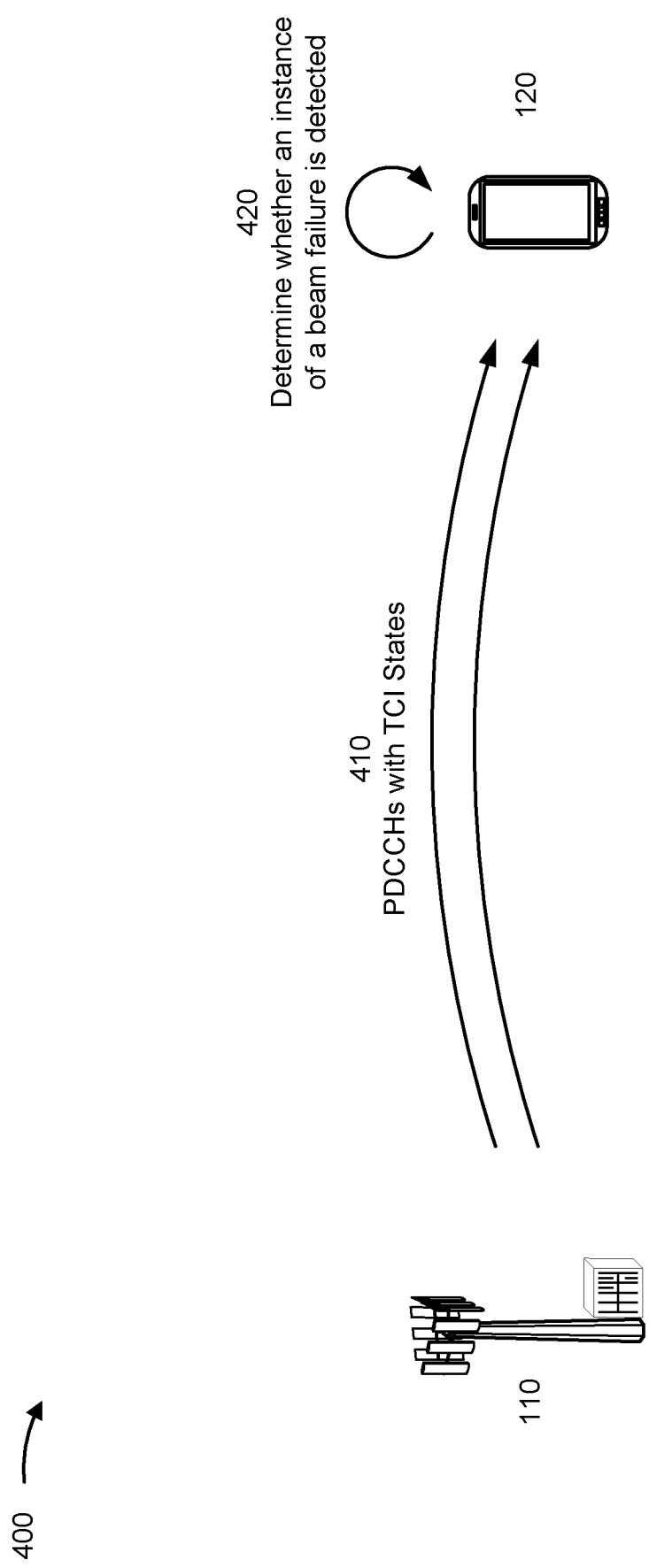
FIG. 4 is a diagram illustrating an example associated with beam failure detection (BFD) evaluation on two transmission configuration indicator (TCI) states, in accordance with the present disclosure.

FIG. 4 is a diagram illustrating an example 400 associated with BFD evaluation on two TCI states, in accordance with the present disclosure. As shown in FIG. 4, example 400 includes communication between a base station 110 and a UE 120. In some aspects, base station 110 and UE 120 may be included in a wireless network, such as wireless network 100. Base station 110 and UE 120 may communicate via a wireless access link, which may include an uplink and a downlink.

As further shown in FIG. 4, and by reference number 410, UE 120 may monitor for a set of PDCCHs associated with a set of TCI states. For example, UE 120 may monitor for at least one PDCCH with two TCI states. In some aspects, the PDCCH may be monitored in a CORESET that is configured with two TCI states. In some aspects, the PDCCH may be monitored with repetition in two CORESETs and each CORESET may be configured with a TCI state. In this case, UE 120 may monitor for a single PDCCH with two TCI states or for a plurality of PDCCHs, each having two TCI states. In some aspects, UE 120 may monitor for a BFD RS associated with a PDCCH. For example, UE 120 may monitor for a BFD RS for each TCI state. In this case, UE 120 may monitor for a first BFD RS of the PDCCH and associated with a first TCI state and for a second BFD RS of the PDCCH and associated with a second TCI state. The BFD RS may include one or more RSs described above with regard to FIG. 3 or another type of RS assigned for use in BFD procedures.

In some aspects, UE 120 may perform a set of BFD measurements associated with the BFD RSs. For example, UE 120 may receive a set of PDCCH transmission parameters that indicate a particular type of measurement or a particular set of measurement parameters for a first BFD RS or a second BFD RS. In this case, the first BFD RS and the second BFD RS may be quasi co-located with quasi co-location (QCL) type-D enabled, and the first TCI state may be active for the first BFD RS and the second TCI state may be active for the second BFD RS. In some aspects, UE 120 may use a set of defined transmission parameters, such as a table of transmission parameters, to configure measurements of the BFD RSs. For example, UE 120 may use Table 8.5.3.1-1 of 3GPP Technical Specification (TS) Release 17 version (v) 17.1.0 to determine the set of PDCCH transmission parameters and perform measurements of the BFD RSs. In some aspects, UE 120 may use the set of PDCCH transmission parameters to evaluate a link quality associated with the BFD RSs. For example, UE 120 may evaluate a reference signal received power (RSRP), a reference signal received quality (RSRQ), a signal to interference and noise ratio (SINR), or a block error rate (BLER), among other examples.

Additionally, or alternatively, UE 120 may use another table of parameters that includes parameters, such as a downlink control information (DCI) format parameter, a quantity of control orthogonal frequency division multiplexing (OFDM) symbols parameter, an aggregation level parameter, an energy ratio parameter (e.g., a ratio of a PDCCH resource element (RE) or PDCCH demodulation reference signal (DMRS) energy to a CSI-RS RE energy), a bandwidth parameter (e.g., identifying a quantity of physical resource blocks (PRBs)), a subcarrier spacing (SCS) parameter, a DMRS precoder granularity parameter, a resource element group (REG) bundle size parameter, a cyclic prefix (CP) length parameter, or a mapping parameter (e.g., defining mapping of REGs to control channel elements (CCEs)), among other examples.

Additionally, or alternatively, UE 120 may determine a set of PDCCH transmission parameters dedicated for use with two or more BFD RSs. For example, UE 120 may store or receive information indicating that a particular quantity of resource blocks (e.g., 96 resource blocks (RBs)) are to be used for the PDCCH transmission, thereby enabling UE 120 to perform measurements of two or more BFD RSs associated with the PDCCH transmission. In some aspects, UE 120 may use the set of PDCCH transmission parameters to evaluate the link quality jointly associated with the two or more BFD RSs.

In some aspects, UE 120 may receive information identifying a set of thresholds. For example, UE 120 may receive an out of synchronization threshold parameter (rlmInSyncOutOfSyncThreshold) and an SSB threshold parameter (rsrp-ThresholdSSB) identifying thresholds for the BFD RSs. In this case, UE 120 may receive an indicator that indicates that the aforementioned parameters are being used to identify thresholds for the BFD RSs rather than for another purpose. Additionally, or alternatively, UE 120 may receive information identifying a dedicated parameter for use with two or more BFD RSs, such as an rlmInSyncOutOfSyncThreshold_twoRS parameter or an rsrp-ThresholdSSB_twoRS parameter, among other examples. Although some aspects are described in terms of a particular set of parameters, other parameters or fields are possible. In some aspects, UE 120 may use the dedicated set of parameters to evaluate the link quality jointly associated with the two or more BFD RSs.

As further shown in FIG. 4, and by reference number 420, UE 120 may determine whether an instance of a beam failure is detected. For example, UE 120 may evaluate a set of PDCCH transmission parameters individually for each BFD RS to determine whether an instance of a beam failure is detected. In this case, UE 120 may determine that a beam failure has occurred based at least in part on a first measurement of a first BFD RS satisfying a first threshold (e.g., a reference signal received power (RSRP) measurement satisfying an RSRP threshold) and a second measurement of a second BFD RS satisfying a second threshold. Alternatively, UE 120 may determine that a beam failure has occurred based at least in part on the first measurement satisfying the first threshold or the second measurement satisfying the second threshold.

Additionally, or alternatively, UE 120 may evaluate a set of PDCCH transmission parameters jointly for each BFD RS. For example, UE 120 may split resource blocks (RBs) of a PDCCH equally for each BFD RS or repeat the RBs of the PDCCH for each BFD RS. In this case, based at least in part on splitting RBs or repeating RBs, UE 120 may evaluate a PDCCH combined candidate to determine whether a threshold is satisfied without evaluating individual PDCCH candidates. Additionally, or alternatively, UE 120 may evaluate the individual PDCCH candidates without combining the individual PDCCH candidates. Additionally, or alternatively, UE 120 may evaluate a first individual PDCCH candidate and a combined PDCCH candidate. Additionally, or alternatively, UE 120 may evaluate each individual PDCCH candidate and a combined PDCCH candidate. In these cases, UE 120 may determine that a beam failure has occurred based at least in part on each evaluation satisfying a threshold, all evaluations satisfying a threshold, or a particular quantity or fraction of evaluations satisfying a threshold, among other examples. In some aspects, a configuration for which evaluations or how many evaluations to use to determine a beam failure may be based at least in part on received radio resource control (RRC) signaling, a UE capability, a stored configuration, or a defined configuration in a standard.

In some aspects, based at least in part on determining whether a beam failure has occurred, UE 120 may perform a response action. For example, when a beam failure is determined to have occurred, UE 120 may communicate with base station 110 to initiate a beam failure recovery procedure. Additionally, or alternatively, when a beam failure is determined to not have occurred, UE 120 may continue monitoring for subsequent PDCCHs to determine if a beam failure occurs at a subsequent time.

As indicated above, FIG. 4 is provided as an example. Other examples may differ from what is described with respect to FIG. 4.

Figure 5:
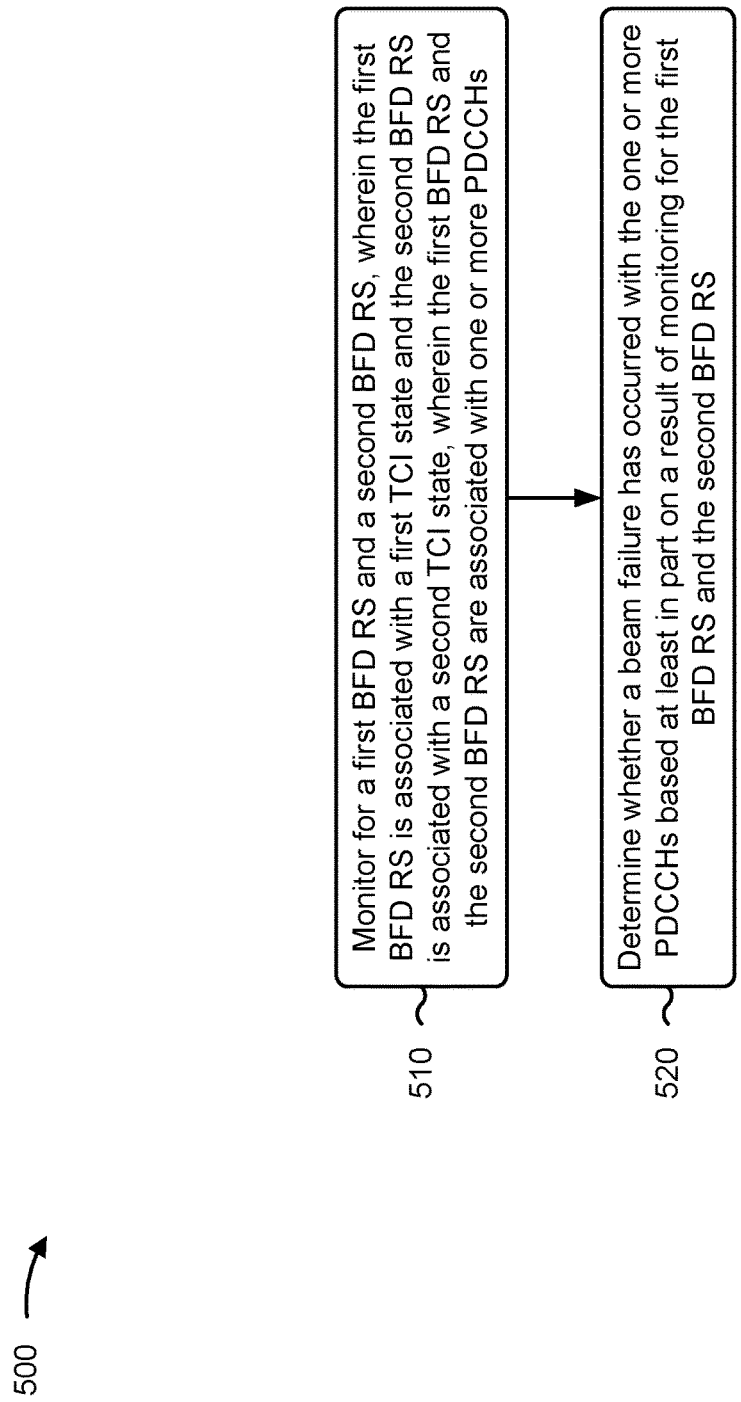
FIG. 5 is a diagram illustrating an example process associated with BFD evaluation on two TCI states, in accordance with the present disclosure.

FIG. 5 is a diagram illustrating an example process 500 performed, for example, by a UE, in accordance with the present disclosure. Example process 500 is an example where the UE (e.g., UE 120) performs operations associated with BFD evaluation on two TCI states.

As shown in FIG. 5, in some aspects, process 500 may include monitoring for a first BFD RS and a second BFD RS, wherein the first BFD RS is associated with a first TCI state and the second BFD RS is associated with a second TCI state, wherein the first BFD RS and the second BFD RS are associated with one or more PDCCHs (block 510). For example, the UE (e.g., using communication manager 140 and/or monitoring component 608, depicted in FIG. 6) may monitor for a first beam failure detection BFD RS and a second BFD RS, wherein the first BFD RS is associated with a first TCI state and the second BFD RS is associated with a second TCI state, wherein the first BFD RS and the second BFD RS are associated with one or more PDCCHs, as described above.

As further shown in FIG. 5, in some aspects, process 500 may include determining whether a beam failure has occurred with the one or more PDCCHs based at least in part on a result of monitoring for the first BFD RS and the second BFD RS (block 520). For example, the UE (e.g., using communication manager 140 and/or determination component 610, depicted in FIG. 6) may determine whether a beam failure has occurred with the one or more PDCCHs based at least in part on a result of monitoring for the first BFD RS and the second BFD RS, as described above.

Process 500 may include additional aspects, such as any single aspect or any combination of aspects described below and/or in connection with one or more other processes described elsewhere herein.

In a first aspect, a PDCCH, of the one or more PDCCHs, is associated with the first TCI state and the second TCI state, and the UE is configured with a set of PDCCH transmission parameters to evaluate to determine whether the beam failure has occurred for the PDCCH based at least in part on the first BFD RS and the second BFD RS.

In a second aspect, alone or in combination with the first aspect, the first BFD RS is quasi co-located with the second BFD RS with quasi co-location Type D, and the first TCI state and the second TCI state are active TCI states for monitoring for the PDCCH.

In a third aspect, alone or in combination with one or more of the first and second aspects, the set of PDCCH transmission parameters are defined by a table mapping a set of attributes to a set of values.

In a fourth aspect, alone or in combination with one or more of the first through third aspects, the table is Table 8.5.3.1-1 of 3GPP Technical Specification 38.133 release 17 version 17.1.0.

In a fifth aspect, alone or in combination with one or more of the first through fourth aspects, the set of PDCCH transmission parameters are defined for usage with two BFD RSs.

In a sixth aspect, alone or in combination with one or more of the first through fifth aspects, a PDCCH, of the one or more PDCCHs, is associated with the first TCI state and the second TCI state, and the UE is configured with a first threshold parameter for detecting beam failure in connection with the first BFD RS and a second threshold parameter for detecting beam failure in connection with the second BFD RS.

In a seventh aspect, alone or in combination with one or more of the first through sixth aspects, at least one of the first threshold parameter or the second threshold parameter uses at least one of an out-of-synchronization threshold parameter or synchronization signal block threshold.

In an eighth aspect, alone or in combination with one or more of the first through seventh aspects, at least one of the first threshold parameter or the second threshold parameter is a dedicated parameter.

In a ninth aspect, alone or in combination with one or more of the first through eighth aspects, determining whether the beam failure has occurred comprises determining that the beam failure has occurred based at least in part on individually evaluating a set of PDCCH transmission parameters associated with the first BFD RS and the second BFD RS.

In a tenth aspect, alone or in combination with one or more of the first through ninth aspects, determining whether the beam failure has occurred comprises determining that the beam failure has occurred based at least in part on determining that a first measurement of the first BFD RS satisfies a first threshold and a second measurement of the second BFD RS satisfies a second threshold.

In an eleventh aspect, alone or in combination with one or more of the first through tenth aspects, determining whether the beam failure has occurred comprises determining that the beam failure has occurred based at least in part on determining that a first measurement of the first BFD RS satisfies a first threshold or a second measurement of the second BFD RS satisfies a second threshold.

In a twelfth aspect, alone or in combination with one or more of the first through eleventh aspects, determining whether the beam failure has occurred comprises determining that the beam failure has occurred based at least in part on jointly evaluating a set of PDCCH transmission parameters associated with the first BFD RS and the second BFD RS.

In a thirteenth aspect, alone or in combination with one or more of the first through twelfth aspects, jointly evaluating the set of PDCCH transmission parameters includes at least one of dividing a set of resource blocks of the one or more PDCCHs into respective subsets for the first BFD RS and the second BFD RS, or repeating a set of resource blocks of the one or more PDCCHs for the first BFD RS and for the second BFD RS.

In a fourteenth aspect, alone or in combination with one or more of the first through thirteenth aspects, determining whether the beam failure has occurred comprises determining that the beam failure has occurred based at least in part on a configuration for determining that the beam failure has occurred, wherein the configuration is based at least in part on a radio resource control indicated configuration or a UE capability.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
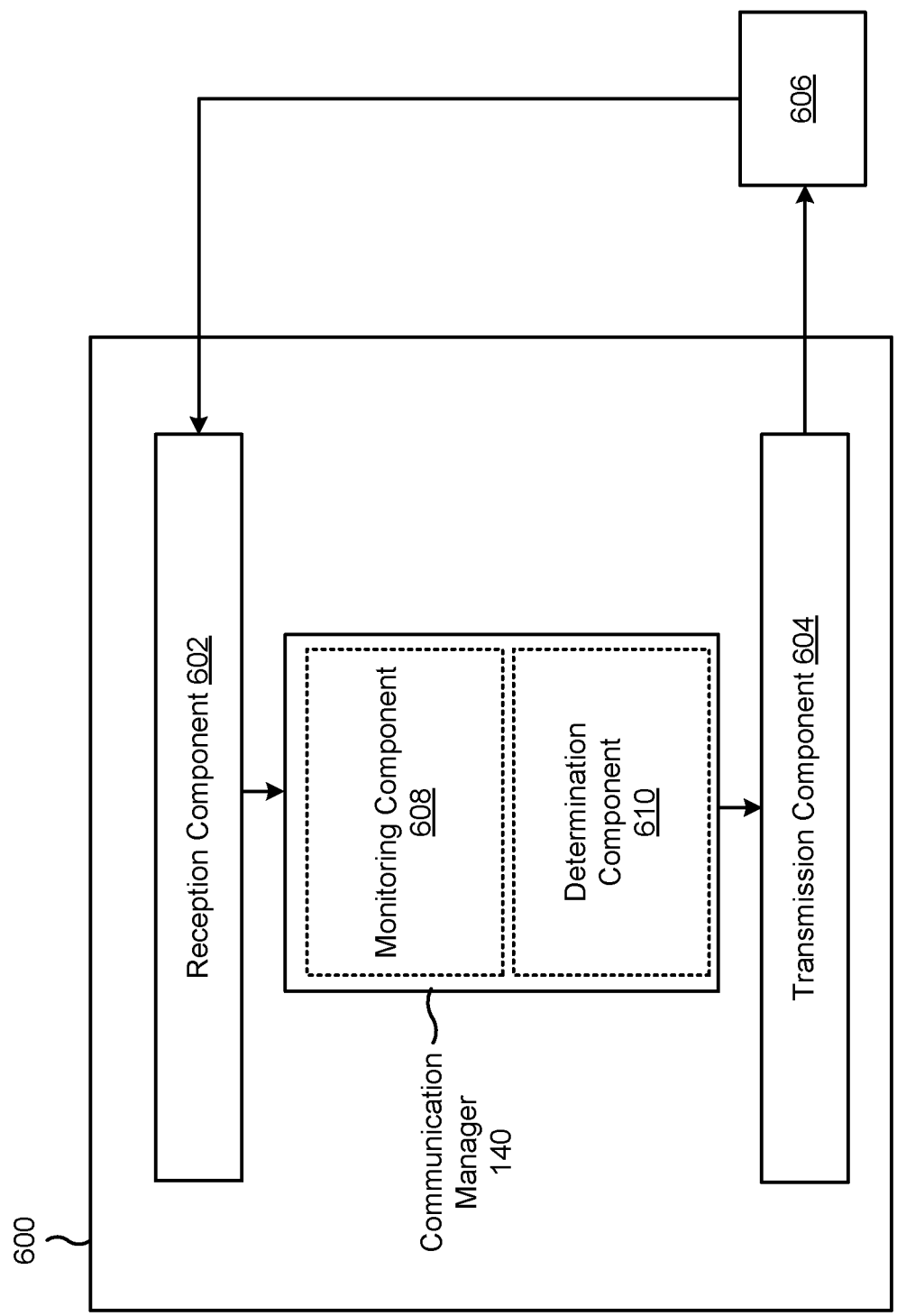
FIGS. 6-7 are block diagrams of example apparatuses for wireless communication, in accordance with the present disclosure.

FIG. 6 is a block diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include the communication manager 140. The communication manager 140 may include one or more of a monitoring component 608 or a determination component 610, among other examples.

In some aspects, the apparatus 600 may be configured to perform one or more operations described herein in connection with FIG. 4. Additionally, or alternatively, the apparatus 600 may be configured to perform one or more processes described herein, such as process 500 of FIG. 5 or a combination thereof. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The monitoring component 608 may monitor for a first BFD RS and a second BFD RS, wherein the first BFD RS is associated with a first TCI state and the second BFD RS is associated with a second TCI state, and wherein the first BFD RS and the second BFD RS are associated with one or more PDCCHs. The determination component 610 may determine whether a beam failure has occurred with the one or more PDCCHs based at least in part on a result of monitoring for the first BFD RS and the second BFD RS.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
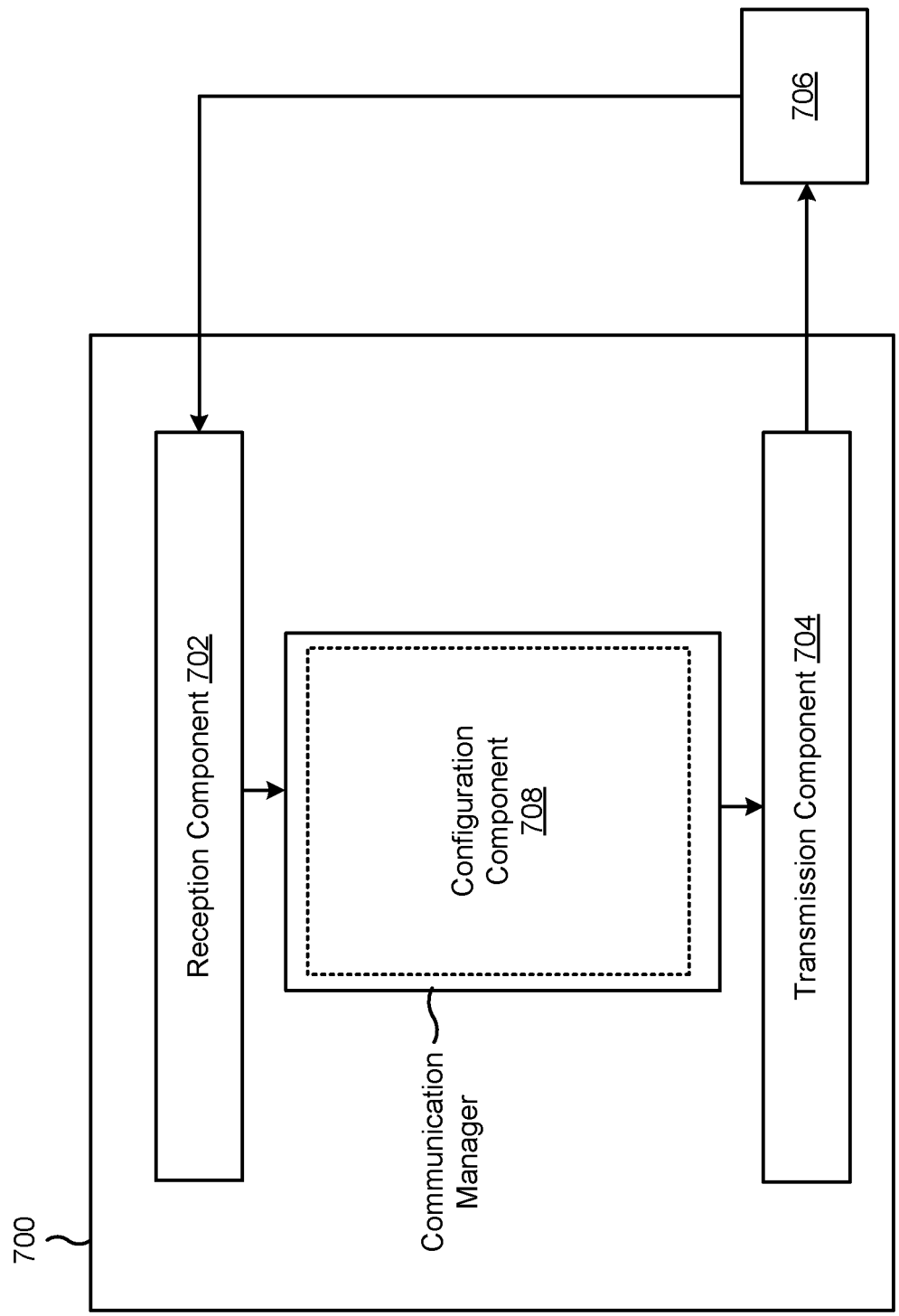

FIG. 7 is a block diagram of an example apparatus 700 for wireless communication. The apparatus 700 may be a BS, or a BS may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a communication manager. The communication manager may include a configuration component 708, among other examples.

In some aspects, the apparatus 700 may be configured to perform one or more operations described herein in connection with FIG. 4. Additionally, or alternatively, the apparatus 700 may be configured to perform one or more processes described herein. In some aspects, the apparatus 700 and/or one or more components shown in FIG. 7 may include one or more components of the BS described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the BS described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the BS described above in connection with FIG. 2. In some aspects, the transmission component 704 may be co-located with the reception component 702 in a transceiver.

The configuration component may configure monitoring, by the apparatus 706, for a first BFD RS and a second BFD RS and evaluating, by the apparatus 706, measurements to determine whether a beam failure has occurred with one or more PDCCHs.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: monitoring for a first beam failure detection (BFD) reference signal (RS) and a second BFD RS, wherein the first BFD RS is associated with a first transmission configuration indicator (TCI) state and the second BFD RS is associated with a second TCI state, wherein the first BFD RS and the second BFD RS are associated with one or more physical downlink control channels (PDCCHs); and determining whether a beam failure has occurred with the one or more PDCCHs based at least in part on a result of monitoring for the first BFD RS and the second BFD RS.

Aspect 2: The method of Aspect 1, wherein a PDCCH, of the one or more PDCCHs, is associated with the first TCI state and the second TCI state, and wherein the UE is configured with a set of PDCCH transmission parameters to evaluate to determine whether the beam failure has occurred for the PDCCH based at least in part on the first BFD RS and the second BFD RS.

Aspect 3: The method of Aspect 2, wherein the first BFD RS is quasi co-located with the second BFD RS with quasi co-location Type D, and wherein the first TCI state and the second TCI state are active TCI states for monitoring for the PDCCH.

Aspect 4: The method of any of Aspects 2 to 3, wherein the set of PDCCH transmission parameters are defined by a table mapping a set of attributes to a set of values.

Aspect 5: The method of Aspect 4, wherein the table is Table 8.5.3.1-1 of 3GPP Technical Specification 38.133 release 17 version 17.1.0.

Aspect 6: The method of any of Aspects 2 to 5, wherein the set of PDCCH transmission parameters are defined for usage with two BFD RSs.

Aspect 7: The method of any of Aspects 1 to 6, wherein a PDCCH, of the one or more PDCCHs, is associated with the first TCI state and the second TCI state, and wherein the UE is configured with a first threshold parameter for detecting beam failure in connection with the first BFD RS and a second threshold parameter for detecting beam failure in connection with the second BFD RS.

Aspect 8: The method of Aspect 7, wherein at least one of the first threshold parameter or the second threshold parameter uses at least one of an out-of-synchronization threshold parameter or synchronization signal block threshold.

Aspect 9: The method of any of Aspects 7 to 8, wherein at least one of the first threshold parameter or the second threshold parameter is a dedicated parameter.

Aspect 10: The method of any of Aspects 1 to 9, wherein determining whether the beam failure has occurred comprises: determining that the beam failure has occurred based at least in part on individually evaluating a set of PDCCH transmission parameters associated with the first BFD RS and the second BFD RS.

Aspect 11: The method of any of Aspects 1 to 10, wherein determining whether the beam failure has occurred comprises: determining that the beam failure has occurred based at least in part on determining that a first measurement of the first BFD RS satisfies a first threshold and a second measurement of the second BFD RS satisfies a second threshold.

Aspect 12: The method of any of Aspects 1 to 11, wherein determining whether the beam failure has occurred comprises: determining that the beam failure has occurred based at least in part on determining that a first measurement of the first BFD RS satisfies a first threshold or a second measurement of the second BFD RS satisfies a second threshold.

Aspect 13: The method of any of Aspects 1 to 12, wherein determining whether the beam failure has occurred comprises: determining that the beam failure has occurred based at least in part on jointly evaluating a set of PDCCH transmission parameters associated with the first BFD RS and the second BFD RS.

Aspect 14: The method of Aspect 13, wherein jointly evaluating the set of PDCCH transmission parameters includes at least one of: dividing a set of resource blocks of the one or more PDCCHs into respective subsets for the first BFD RS and the second BFD RS, or repeating a set of resource blocks of the one or more PDCCHs for the first BFD RS and for the second BFD RS.

Aspect 15: The method of any of Aspects 1 to 14, wherein determining whether the beam failure has occurred comprises: determining that the beam failure has occurred based at least in part on a configuration for determining that the beam failure has occurred, wherein the configuration is based at least in part on a radio resource control indicated configuration or a UE capability.

Aspect 16: An apparatus for wireless communication at a device, comprising a processor; memory coupled with the processor; and instructions stored in the memory and executable by the processor to cause the apparatus to perform the method of one or more Aspects of Aspects 1-15.

Aspect 17: A device for wireless communication, comprising a memory and one or more processors coupled to the memory, the memory and the one or more processors configured to perform the method of one or more Aspects of Aspects 1-15.

Aspect 18: An apparatus for wireless communication, comprising at least one means for performing the method of one or more Aspects of Aspects 1-15.

Aspect 19: A non-transitory computer-readable medium storing code for wireless communication, the code comprising instructions executable by a processor to perform the method of one or more Aspects of Aspects 1-15.

Aspect 20: A non-transitory computer-readable medium storing a set of instructions for wireless communication, the set of instructions comprising one or more instructions that, when executed by one or more processors of a device, cause the device to perform the method of one or more Aspects of Aspects 1-15.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   memory; and
   one or more processors, coupled to the memory, configured to:
   monitor for a first beam failure detection (BFD) reference signal (RS) and a second BFD RS, wherein the first BFD RS is associated with a first transmission configuration indicator (TCI) state and the second BFD RS is associated with a second TCI state, wherein the first BFD RS and the second BFD RS are associated with one or more physical downlink control channels (PDCCHs); and
   determine whether a beam failure has occurred with the one or more PDCCHs based at least in part on a result of monitoring for the first BFD RS and the second BFD RS,
   wherein the one or more processors, to determine whether the beam failure has occurred, are configured to:
   determine that the beam failure has occurred based at least in part on a configuration for determining that the beam failure has occurred, wherein the configuration is based at least in part on a radio resource control indicated configuration or a UE capability.

2. The UE of claim 1, wherein a PDCCH, of the one or more PDCCHs, is associated with the first TCI state and the second TCI state, and
   wherein the UE is configured with a set of PDCCH transmission parameters to evaluate to determine whether the beam failure has occurred for the PDCCH based at least in part on the first BFD RS and the second BFD RS.

3. The UE of claim 2, wherein the first BFD RS is quasi co-located with the second BFD RS with quasi co-location Type D, and
   wherein the first TCI state and the second TCI state are active TCI states for monitoring for the PDCCH.

4. The UE of claim 2, wherein the set of PDCCH transmission parameters are defined by a table mapping a set of attributes to a set of values.

5. The UE of claim 4, wherein the table is Table 8.5.3.1-1 of 3GPP Technical Specification 38.133 release 17 version 17.1.0.

6. The UE of claim 2, wherein the set of PDCCH transmission parameters are defined for usage with two BFD RSs.

7. The UE of claim 1, wherein a PDCCH, of the one or more PDCCHs, is associated with the first TCI state and the second TCI state, and
   wherein the UE is configured with a first threshold parameter for detecting beam failure in connection with the first BFD RS and a second threshold parameter for detecting beam failure in connection with the second BFD RS.

8. The UE of claim 7, wherein at least one of the first threshold parameter or the second threshold parameter uses at least one of an out-of-synchronization threshold parameter or synchronization signal block threshold.

9. The UE of claim 7, wherein at least one of the first threshold parameter or the second threshold parameter is a dedicated parameter.

10. The UE of claim 1, wherein the one or more processors, to determine whether the beam failure has occurred, are configured to:
    determine that the beam failure has occurred based at least in part on individually evaluating a set of PDCCH transmission parameters associated with the first BFD RS and the second BFD RS.

11. The UE of claim 1, wherein the one or more processors, to determine whether the beam failure has occurred, are configured to:
    determine that the beam failure has occurred based at least in part on determining that a first measurement of the first BFD RS satisfies a first threshold and a second measurement of the second BFD RS satisfies a second threshold.

12. The UE of claim 1, wherein the one or more processors, to determine whether the beam failure has occurred, are configured to:
    determine that the beam failure has occurred based at least in part on determining that a first measurement of the first BFD RS satisfies a first threshold or a second measurement of the second BFD RS satisfies a second threshold.

13. The UE of claim 1, wherein the one or more processors, to determine whether the beam failure has occurred, are configured to:

determine that the beam failure has occurred based at least in part on jointly evaluating a set of PDCCH transmission parameters associated with the first BFD RS and the second BFD RS.

14. The UE of claim 13, wherein the one or more processors, to jointly evaluate the set of PDCCH transmission parameters, are configured to:
divide a set of resource blocks of the one or more PDCCHs into respective subsets for the first BFD RS and the second BFD RS, or repeat a set of resource blocks of the one or more PDCCHs for the first BFD RS and for the second BFD RS.

15. A method of wireless communication performed by a user equipment (UE), comprising:
monitoring for a first beam failure detection (BFD) reference signal (RS) and a second BFD RS, wherein the first BFD RS is associated with a first transmission configuration indicator (TCI) state and the second BFD RS is associated with a second TCI state, wherein the first BFD RS and the second BFD RS are associated with one or more physical downlink control channels (PDCCHs); and
determining whether a beam failure has occurred with the one or more PDCCHs based at least in part on a result of monitoring for the first BFD RS and the second BFD RS, wherein determining whether the beam failure has occurred comprises:
determining that the beam failure has occurred based at least in part on a configuration for determining that the beam failure has occurred, wherein the configuration is based at least in part on a radio resource control indicated configuration or a UE capability.

16. The method of claim 15, wherein a PDCCH, of the one or more PDCCHs, is associated with the first TCI state and the second TCI state, and
wherein the UE is configured with a set of PDCCH transmission parameters to evaluate to determine whether the beam failure has occurred for the PDCCH based at least in part on the first BFD RS and the second BFD RS.

17. The method of claim 16, wherein the first BFD RS is quasi co-located with the second BFD RS with quasi co-location Type D, and
wherein the first TCI state and the second TCI state are active TCI states for monitoring for the PDCCH.

18. The method of claim 16, wherein the set of PDCCH transmission parameters are defined by a table mapping a set of attributes to a set of values.

19. The method of claim 18, wherein the table is Table 8.5.3.1-1 of 3GPP Technical Specification 38.133 release 17 version 17.1.0.

20. The method of claim 16, wherein the set of PDCCH transmission parameters are defined for usage with two BFD RSs.

21. The method of claim 15, wherein a PDCCH, of the one or more PDCCHs, is associated with the first TCI state and the second TCI state, and
wherein the UE is configured with a first threshold parameter for detecting beam failure in connection with the first BFD RS and a second threshold parameter for detecting beam failure in connection with the second BFD RS.

22. The method of claim 21, wherein at least one of the first threshold parameter or the second threshold parameter uses at least one of an out-of-synchronization threshold parameter or synchronization signal block threshold.

23. The method of claim 21, wherein at least one of the first threshold parameter or the second threshold parameter is a dedicated parameter.

24. The method of claim 15, wherein determining whether the beam failure has occurred comprises:
determining that the beam failure has occurred based at least in part on individually evaluating a set of PDCCH transmission parameters associated with the first BFD RS and the second BFD RS.

25. The method of claim 15, wherein determining whether the beam failure has occurred comprises:
determining that the beam failure has occurred based at least in part on determining that a first measurement of the first BFD RS satisfies a first threshold and a second measurement of the second BFD RS satisfies a second threshold.

26. The method of claim 15, wherein determining whether the beam failure has occurred comprises:
determining that the beam failure has occurred based at least in part on determining that a first measurement of the first BFD RS satisfies a first threshold or a second measurement of the second BFD RS satisfies a second threshold.

27. A non-transitory computer-readable medium storing a set of instructions for wireless communication, the set of instructions comprising:
one or more instructions that, when executed by one or more processors of a user equipment (UE), cause the UE to:
monitor for a first beam failure detection (BFD) reference signal (RS) and a second BFD RS, wherein the first BFD RS is associated with a first transmission configuration indicator (TCI) state and the second BFD RS is associated with a second TCI state, wherein the first BFD RS and the second BFD RS are associated with one or more physical downlink control channels (PDCCHs); and
determine whether a beam failure has occurred with the one or more PDCCHs based at least in part on a result of monitoring for the first BFD RS and the second BFD RS,
wherein the one or more instructions, to determine whether the beam failure has occurred, cause the UE to:
determine that the beam failure has occurred based at least in part on a configuration for determining that the beam failure has occurred, wherein the configuration is based at least in part on a radio resource control indicated configuration or a UE capability.

28. An apparatus for wireless communication, comprising:
means for monitoring for a first beam failure detection (BFD) reference signal (RS) and a second BFD RS, wherein the first BFD RS is associated with a first transmission configuration indicator (TCI) state and the second BFD RS is associated with a second TCI state, wherein the first BFD RS and the second BFD RS are associated with one or more physical downlink control channels (PDCCHs); and
means for determining whether a beam failure has occurred with the one or more PDCCHs based at least in part on a result of monitoring for the first BFD RS and the second BFD RS, wherein the means for determining whether the beam failure has occurred comprises:
means for determining that the beam failure has occurred based at least in part on a configuration for determining that the beam failure has occurred, wherein the configuration is based at least in part on a radio resource control indicated configuration or a UE capability.

* * * * *